March 24, 1970     G. O. HOFFSTETTER     3,502,245
HEATING MEANS FOR GRAVITY FLOW TYPE HOPPERS
HAVING CONVEYOR DISCHARGE MEANS
Filed May 27, 1968
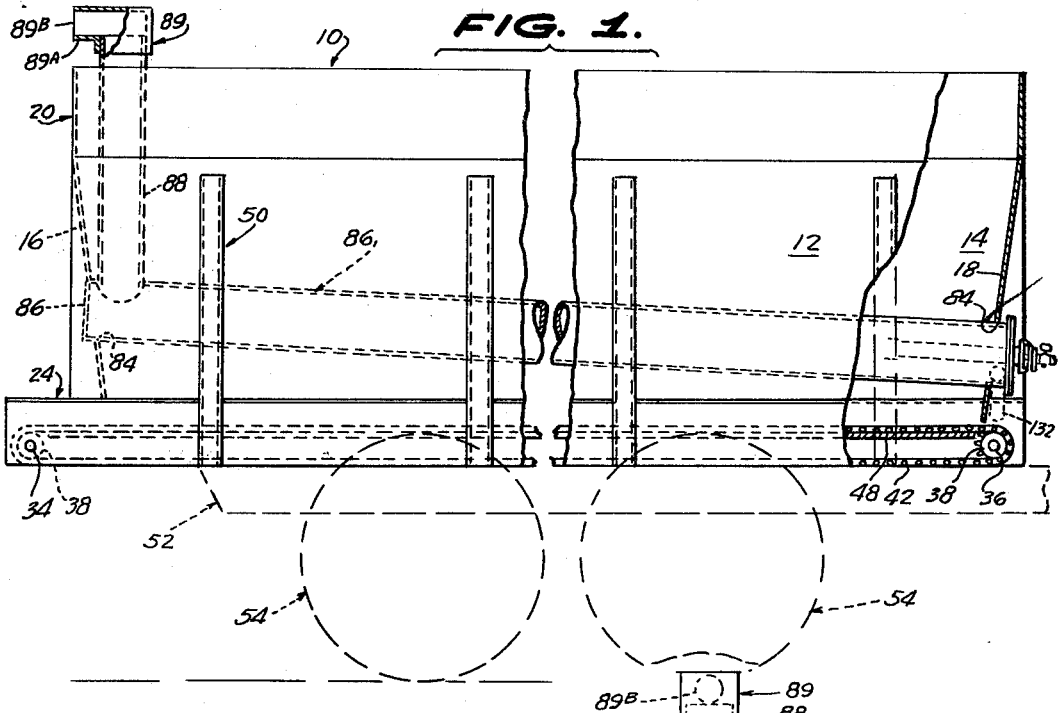
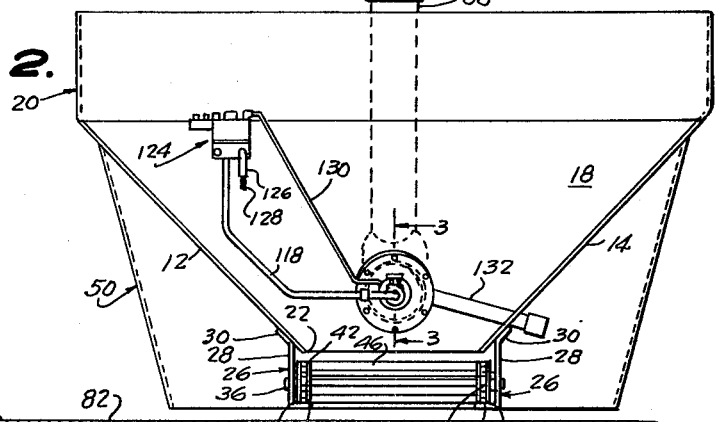
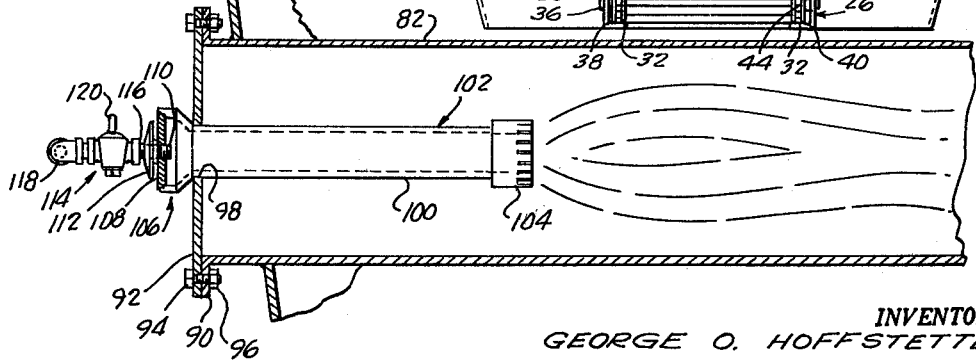
INVENTOR.
GEORGE O. HOFFSTETTER,
BY Kimmel, Crowell & Weaver.
ATTORNEYS.

United States Patent Office 3,502,245
Patented Mar. 24, 1970

3,502,245
HEATING MEANS FOR GRAVITY FLOW TYPE HOPPERS HAVING CONVEYOR DISCHARGE MEANS
George O. Hoffstetter, Jerseyville, Ill., assignor to Baughman Manufacturing Company, Jerseyville, Ill., a corporation of Illinois
Filed May 27, 1968, Ser. No. 732,334
Int. Cl. B67d 5/62; E01c 19/45
U.S. Cl. 222—146                                      9 Claims

ABSTRACT OF THE DISCLOSURE

Hopper heating means for gravity flow type hoppers and comprising an elongated open-ended conduit extending longitudinally and centrally thereof adjacent its lower material discharge end, the conduit being disposed in heat exchange relationship with granule, particle, particulate, lump and other relatively sized materials received within the hopper to be discharged therefrom via conveyor means adjacent the lower discharge end of the hopper, the heat source being derived from the manifold exhaust gas of an internal combustion engine and/or from burner means supplied by an independent source of fuel energy.

BACKGROUND OF INVENTION

The instant invention relates to the general field of material handling and treating and involves apparatus of the gravity flow hopper type which is provided with an internally disposed heating means which, in the preferred embodiment, comprises one or more lengths of open-ended heating tubes or conduits disposed in heat exchange relation relative to the hopper contained material, together with endless belt, chain or screw conveyor means to receive the heat treated material and to discharge the same over an underlying surface.

With respect to this invention perhaps the best known prior art reference comprises my own U.S. Patent No. 2,543,287, entitled "Conveyor and Heater Therefor," filed Jan. 17, 1946, and which issued on Feb. 17, 1946. This patent discloses, in substance, a gravity flow type hopper wherein the material received within the hopper is discharged on conveyor means for transport and/or distribution at sites or locations adjacent thereto. One of the salient features or the primary objects of that invention was to provide means for heating the conveying means to prevent it from freezing in cold climates and thus to jam with the consequent attendant damage to the mechanical components thereof. In the course of heating the conveyor, a further desirable object was also attained in that the material in or adjacent the lower end of the hopper received heat radiated from the conveyor means and thus it, too, was prevented from freezing under adverse winter weather conditions.

While the apparatus according to the patented invention served its intended purposes and functions, the apparatus suffered some drawbacks under certain conditions of operation. For example, in freezing weather and when the material to be distributed was of rather small size, the material over the hopper discharge opening would tend to bridge and accumulate thereover and, despite the heat radiated from the conveyor means, the material would freeze to render the apparatus somewhat ineffective in performing at peak efficiency. Further, it was also found that in the patented invention, when the same was practiced with the endless belt, chain or screw type conveyor with the heating means disposed between the upper and lower flights thereof, the apparatus incurred the disadvantage of having material accumulate in the heat exchange receptacle and to back up therein to block the fluid heat inlet and outlet ports.

The apparatus of the patent found many fields of application but perhaps its major impact on the public resulted in its adaptation to a wheeled vehicle for the distribution of snow and ice melting materials over roads, sidewalks and other related vehicle and pedestrian traveled surfaces.

With the widespread acceptance of the patented apparatus it became mandatory to improve thereon to obviate its several known disadvantages and to provide a more efficient machine.

SUMMARY OF THE INVENTION

Thus, one of the primary objects of this invention is to provide a wheel supported gravity flow hopper with internally located material and conveyor discharge heating means to prevent the freezing of either when operating under low temperature weather conditions.

A further object of this invention is to provide heating means of the type referred to supra which inherently functions to prevent the formation of material formed bridges over the hopper discharge opening.

Another object of this invention is to provide heating means of the kind aforementioned and wherein the heating means extends substantially the length of the hopper adjacent its lower discharge end and which also includes an upright portion adjacent an end of the vehicle to effect material heating in the zone extending between the upper and lower ends of the hopper.

It is a further object of this invention to provide a hopper for receiving metallic salts reduced to relatively small size particles or lumps, sand, cinders and like materials for seeding depths of accumulated snow and ice on roads to react therewith to form a brine and to reduce the accumulations to a mush-like consistency whereby the roads are made easy to plow with substantially total removal of the accumulation, and to obtain, as it is known in the art, a "surface free road" or "dry pavement maintenance."

Still another object of this invention is to provide apparatus of the type described above to heat particle size materials whereby the same, upon discharge from the conveyor, quickly penetrate and in a sense, perforate the snow and/or ice before the material may be blown away by winds and thus become ineffective. This results in a high economic savings not only from the cost standpoint for materials but also in time savings since it is only necessary to seed one accumulation of snow and/or ice to permit it to be substantially totally removed.

Still another object of this invention is to relate and dispose the longitudinally extending conduit in the hopper in such a manner that the same serves as a choker to relieve the overhead load on the conveyor means.

It is a still further object of this invention to provide a heat source for the heat means utilizing internal combustion engine exhaust gases as a heating medium and/or, optionally, burner means furnished with an independent source of combustible material.

Other and further objects and advantages of the instant invention will become more manifest from the following specification when read in conjunction with the annexed drawings.

SPECIFICATION

In the drawings:

FIGURE 1 is a side elevational view of a hopper constructed according to this invention, FIGURE 1 being partially broken away and in cross-section to clearly illustrate components thereof;

FIGURE 2 is a front elevational view of the hopper shown in FIGURE 1; and

FIGURE 3 is an enlarged fragmentary detail cross-sectional view, FIGURE 3 being taken substantially on the vertical plane of line 3—3 of FIGURE 2, looking in the direction of the arrows.

To this point the present invention has been related to its use in treating accumulations of snow or ice in such a manner as to permit it to be easily removed from roads or street surfaces. While the use of the apparatus according to this invention has been recited in a given environment it is to be understood that such use and environment as described above are not to be contrued as comprising limitations for, obviously, other uses may be made of the apparatus under other background conditions. For example, in farm husbandry the apparatus is suitable for use with a material spreader or broadcasting apparatus for distributing lime, fertilizer and the like. Again, the apparatus may be utilized in the delivery of grain, or in other fields such as in the conveying of coal and other similar lump or particle sized solid materials.

In the specifically described use of the apparatus of this invention, the preferred materials are recited as comprising metallic salts. From testing under adverse weather conditions of snow and ice, such materials preferably comprise a salt such as sodium chloride or calcium chloride. These salts have given excellent results although clearly other related metallic salts could be employed if desired. Sodium chloride and calcium chloride salts are comparatively inexpensive and therefore are economic to use but these specific salts are not considered to be critical in the practice of this invention. For example, it has also been found through testing that sand, cinders and other similar materials will also provide satisfactory results.

The heat source for this apparatus may be derived, as mentioned above, from the exhaust gas of an internal combustion engine such as is commonly used in automotive vehicles. Generally, such exhaust gases are expelled into the atmosphere at temperatures averaging between 100° to 150° F., and when connected with the heating conduit of this invention the material in the hopper becomes heated to a sufficiently high temperature to enable it to quickly melt and penetrate the snow or ice while being at a temperature well below the melting point of the heat treated materail.

This invention also contemplates, as will become manifest below, the provision of an alternate source of heat, namely, in the provision of conventional burner means which is inserted in the heating tube or conduit and which is supplied with an external source of combustible material.

Referring now more specifically to the drawing, reference numeral 10 designates, in general, a hopper constructed in accordance with the teachings of this invention. The hopper 10 has, generally, an inverted frusto-pyramidal configuration including an opposed pair of downwardly converging side walls 12, 14 to each adjacent pair of ends of which is fixedly connected an end wall 16, 18, respectively. As is seen in FIGURES 1 and 2, the upper ends of the side and end walls terminate in a normally upright peripheral flange 20.

The downwardly converging side walls 12, 14 terminate in the plane of their frustum to define an elongated substantially rectangular discharge opening extending substantially throughout the longitudinal axis of the hopper 10.

Reference numeral 24 denotes a conventional endless belt type conveyor system which comprises a pair of elongated opposed parallel laterally spaced and identically constructed conveyor hanger brackets 26, 26, each of which includes a normally upright bight 28 (see FIGURES 1 and 2) and an upwardly inclined laterally offset end 30. Any means (not shown) conventional in the art may be used to fixedly connect the offset ends 30 to the exterior side of the side walls 12, 14 adjacent their respective lower marginal edge. The other end of each bight 28 terminates in a laterally offset flange 32 with the flanges 32 being disposed in laterally spaced parallel and confronting relationship relative to one another.

The opposed ends of a pair of shafts 34, 36 are journalled for rotation in the bights 28, the shaft 34 being positioned adjacent the rear end wall 18 at the discharge end of the conveyor system 24 while the shaft 36 is positioned adjacent the front end wall 18 adjacent the other end of the conveyor system 24. In the conventional manner, each shaft 34, 36 has a pair of sprockets 38, 40 fixedly connected thereon for rotation therewith, the sprockets 38 and 40 at the opposed ends of their shafts being aligned with one another, all in the conventional manner. The sprockets overhang the flanges 32 and each aligned pair of sprockets have endless chains 42, 44 trained thereabout. The chains 42, 44 are, in turn, fixedly connected to a suitable endless conveyor belt 46 at the opposed edges thereof, all in the manner well known in the art. An elongated substantially rectangular support plate 48 extends transversely between the bights 28 to which it is fixedly connected, the plate 48 being disposed immediately below the upper flight portion of the belt 46 which is in sliding superimposition thereover.

At suitable longitudinally spaced intervals, the hopper 10 is provided with reinforcing means such as, for example, gusset plates 50.

The hopper 10 and its associated conveyor system 24 are adapted, if desired, for mounting on the chassis or frame 52 supported on wheels 54. Since the transport means do not constitute, per se, the subject matter of this invention, the same have been illustrated in dotted lines herein only for background purposes.

It should also be remarked that the conveyor means briefly described above may be of any conventional and suitable endless belt type including, of course, a stainless steel conveyor chain belt. Obviously the proper conveyor will be preselected in accordance with the material being handled and the condition of the proposed usage of the hopper means 10. Further, it will be also understood that the conveyor means may be ground driven or operated by suitable power take-off means or by an independent power source, all as desired.

The material heating means, the subject matter of this invention, bears the general reference numeral 80. This means comprises an elongated hollow cylindrical heat conveying main conduit 82 which extends longitudinally of the hopper 10 and, as is seen in FIGURES 1 and 2, the main conduit 82 inclines downwardly from the rear wall 16 towards the front wall 18. The axis of the conduit forms an acute angle relative to the normally horizontal plane of the frustum of the hopper side and end walls.

The conduit 82 is of such length as to extend through suitable openings 84, 86 formed in the end walls 16, 18, respectively, and it is fixedly secured therein as by welding or by other conventional means (not shown). That end of the conduit 82 immediately adjacent the end wall 16 is closed by a closure plate 86 and, as is seen in FIGURE 1, one end of a normally upright exhaust conduit 88 of reduced diameter is rigidly connected to and is in open communication with the conduit 82 adjacent its last mentioned end. The other end of the exhaust conduit 88 extends above the upper edge of the peripheral flange 20 and vents to the atmosphere through a hollow L-shaped cap 89 having a rearwardly extending leg 89A open at its outer end 89B. The cap 89 prevents material being loaded into the hopper 10 from inadvertent or accidental entry into the conduits 88, 82 and to accumulate therein to reduce the efficiency of the heat exchange means. The reduced diameter of the conduit 88 restrains the flow of gases through the conduits to obtain the maximum of heat energy therefrom.

The other or forward end of the conduit 82 is formed with a circumferential laterally projecting flange 90 (see FIGURE 3). Superimposed against the flange 90 is an end closure plate 92 which is releasably connected thereto by bolts 94 and nuts 96. Extending through the closure plate 92, through a suitable opening 98 formed therein, is the elongated cylindrical body portion 100 of a conventional butane burner 102 having a nozzle end 104. As is seen in FIGURE 3, substantially the entire body portion 100 of the burner 102 is disposed within the forward end of the conduit 82, the external portion 106 thereof being provided with the usual end closure plate 108 in which is mounted a transversely extending nozzle 110 and a jam plate 112.

A conventional valve coupler 114 has its outlet side 116 connected to the external end of the nozzle 110 and its inlet end connected to one end of the master fuel supply line 118. The valved coupler includes the conventional operating handle 120.

Mounted on the end wall 18 are the usual conventional controls indicated generally at 122. These are schematically illustrated, being old and well known in the art, and include a pilot light electrical igniter switch and gas controls for burner ignition, a master control valve specifically designated at 124 to stop gas flow in case of a flame-out, a fitting 126 and conduit 128 connecting the master control valve with a gas storage tank (not shown) which may be secured on the hopper 10 at any desired location, and a pilot line conduit 130 for the conventional gas pilot light (not shown).

As has been stated above, this invention contemplates the use of a second heat source. Namely, it is proposed to utilize the heat derived from the exhaust gases of an internal combustion engine as an inexpensive source of heat energy. To this end, one end of a conduit 132 is extended through the side wall 14 adjacent the end wall 18 and through the adjacent end of the conduit 82 with which it is in open communication. The other end of the conduit 132 is adapted to be coupled at 124 with the exhaust pipe of any conventional and operating internal combustion engine to receive the exhaust gases therefrom.

It is important to here note that the conduit 82 extends centrally of the discharge opening 22 and longitudinally thereof. In this position, the conduit 82 serves as choker means to prevent overloading of the conveyor means 24, and the angle of inclination of the conduit 82 is such that it creates a natural draft of the gas exhaust and heater towards the rear of the unit where it is exhausted through the conduit 88.

By way of a short summary, the intent of this invention is to provide hopper means for heating the above named salts, abrasive or other related materials whereby the action of each on snow or ice will take place more quickly. If the salts or other related materials are utilized, in their heated form the selected material will penetrate the ice and snow very rapidly to perforate the accumulated mass thereof and to begin the formation of salt and chloride brines very quickly. This prepares the seeded mass for rapid plowing of highways on which the salts are scattered. In the case of the use of abrasives, the heated material will again penetrate the surface very quickly and cannot, therefore, be blown away by natural winds or winds created by passing cars and trucks. This affords, of course, greater traction over slick or slippery surfaces.

Through the relatively close juxtaposition of the heat exchange conduit 82 with respect to the conveyor means 24, any condensation which may accumulate thereon is prevented from freezing, and at the same time, the conveyor greases are prevented from solidifying or freezing to render the conveyor inoperative to serve its intended function.

The hopper 10, from the foregoing description, is seen to comprise a self contained unit which may quickly and easily be installed in any conventional automotive vehicle having a conventional open rear chassis. As such, the hopper device 10 may be operated by utilizing the butane heating means, the heat derived from the internal combustion exhaust gases, and/or both simultaneously. As a self contained unit the hopper may be supported on a stationary base and the butane heating means could be utilized together with the exhaust gases from a stationary internal combustion engine or from the exhaust manifold of an automotive vehicle. Again, both heat sources may be used simultaneously if desired.

Having described and illustrated a preferred embodiment of this invention, it will be understood that the same is offered merely by way of example, and that this invention is to be limited only by the scope of the appended claims.

What is claimed is:

1. Material heat treating and handling apparatus comprising, in combination:
a normally upright substantially hollow gravity flow type hopper having a material discharge opening formed in the lower end thereof;
conveyor means disposed below said material discharge opening and in confronting relation relative thereto; and
heat exchange means disposed in said hopper adjacent to but spaced from said discharge opening to heat the material in said hopper and said conveyor means underlying said discharge opening, said heat exchange means being disposed in the path of travel of the material flowing under gravitational force from said hopper through said material discharge opening to be received on said conveyor means.

2. Apparatus as defined in claim 1 and wherein
said heat exchange means comprises an elongated hollow conduit to receive a heated fluid medium therein.

3. Apparatus as defined in claim 1 wherein
said hopper includes a pair of spaced confronting end walls;
said heat exchange means comprising an elongated hollow conduit disposed at an acute angle relative to a horizontal plane and extending between said end walls, means venting one end of said conduit to the atmosphere; and
wherein the heating medium comprises the gaseous products of combustion.

4. Apparatus as defined in claim 1 wherein
said hopper includes a pair of spaced confronting end walls;
said heat exchange means comprises an elongated substantially hollow first conduit disposed at an acute angle relative to a horizontal plane and extending between said end walls, an exhaust conduit having an end thereof in open communication with the upper end of said first conduit, the other end of said exhaust conduit extending upwardly from said first conduit and opening to the atmosphere; and
and wherein the heating means comprises the gaseous products of combustion.

5. Apparatus as defined in claim 1 wherein
said hopper includes a pair of spaced confronting end walls;
said heat exchange means comprises an elongated substantially hollow first conduit disposed at an acute angle relative to a horizontal plane and extending between said end walls, means connecting the opposed ends, respectively, of said first conduit on said end walls, an exhaust conduit having an internal diameter less than the internal diameter of said first conduit and having an end thereof in open communication with the upper end of said first conduit, the other end of said exhaust conduit extending upwardly from said first conduit adjacent one of said end walls and venting to the ambient atmosphere thereabove; and
means introducing fluid heat media into said first conduit adjacent its lower end.

6. Apparatus as defined in claim 1 wherein said hopper includes a pair of spaced confronting end walls;

said heat exchange means comprises an elongated substantially hollow first conduit disposed at an acute angle relative to a horizontal plane and extending between said end walls, means fixedly connecting the opposed ends, respectively, of said first conduit on said end walls, an exhaust conduit having an internal diameter less than the internal diameter of said first conduit and having an end thereof in open communication with the upper end of said first conduit, the other end of said exhaust conduit extending upwardly from said first conduit adjacent one of said end walls and venting to the ambient atmosphere thereabove, said first conduit extending longitudinally of said discharge opening and being disposed in upwardly spaced relationship relative thereto; and burner means disposed within the lower end of said first conduit connected with a source of a combustible fluid to generate a fluid heat medium in said first conduit.

7. Apparatus as defined in claim 6 and
a second conduit opening into said first conduit adjacent said burner means, said second conduit being adapted for connection to a second fluid heat source.

8. Apparatus as defined in claim 7 and means closing said other end of said exhaust conduit and venting the same in the direction of said one end wall 9. Apparatus as defined in claim 1 and wherein
said end walls are disposed in longitudinally spaced relationship relative to one another;

said hopper discharge opening and said conveyor means being elongated in the direction thereof and to extend between said end walls; and said conveyor means having its discharge end disposed adjacent to but spaced from said one end wall of said hopper.

References Cited

UNITED STATES PATENTS

| | | | |
|---|---|---|---|
| 2,543,287 | 2/1951 | Hoffstetter. | |
| 2,839,332 | 6/1958 | Sackett. | |
| 2,951,477 | 9/1960 | Harper | 126—360 |
| 3,235,268 | 2/1966 | McLean | 222—146 |
| 3,315,659 | 4/1967 | Schmitz. | |

CHARLES J. MYHRE, Primary Examiner

U.S. Cl. X.R.

126—343.5; 222—178